(12) United States Patent
Yasukawa et al.

(10) Patent No.: US 7,447,564 B2
(45) Date of Patent: Nov. 4, 2008

(54) ROBOT

(75) Inventors: Yusuke Yasukawa, Kawasaki (JP); Hirohiko Fukuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 10/648,190

(22) Filed: Aug. 27, 2003

(65) Prior Publication Data
US 2004/0066917 A1 Apr. 8, 2004

(30) Foreign Application Priority Data
Oct. 4, 2002 (JP) ............................. 2002-292768

(51) Int. Cl.
*G05B 19/04* (2006.01)
(52) U.S. Cl. ................... 700/246; 318/568.12; 379/38; 379/40; 379/41; 379/42; 700/247; 700/253; 700/257; 700/258; 700/264
(58) Field of Classification Search ................. 348/158; 700/246–247, 253, 257–258, 264; 379/40–42, 379/38; 318/568.12
See application file for complete search history.

(56) References Cited

U.S. PATENT DOCUMENTS

| | | | | |
|---|---|---|---|---|
| 5,369,346 A | * | 11/1994 | Takahashi et al. | 318/568.17 |
| 5,446,445 A | * | 8/1995 | Bloomfield et al. | 340/521 |
| 5,475,748 A | | 12/1995 | Jones | |
| 5,705,906 A | * | 1/1998 | Tanabe et al. | 318/568.13 |
| 5,802,494 A | | 9/1998 | Kuno | |
| 5,870,454 A | * | 2/1999 | Dahlen | 379/88.14 |
| 5,933,080 A | * | 8/1999 | Nojima | 340/426.19 |
| 6,064,303 A | * | 5/2000 | Klein et al. | 340/506 |
| 6,584,375 B2 | * | 6/2003 | Bancroft et al. | 700/213 |
| 6,703,930 B2 | * | 3/2004 | Skinner | 340/539.11 |
| 6,907,388 B2 | * | 6/2005 | Suzuki et al. | 702/188 |
| 7,065,430 B2 | * | 6/2006 | Naka et al. | 700/245 |
| 2002/0137489 A1 | * | 9/2002 | Dutta et al. | 455/404 |

(Continued)

FOREIGN PATENT DOCUMENTS

EP 0 522 200 A2 1/1993

(Continued)

OTHER PUBLICATIONS

Schultz et al., "Tele Mobile Robot for Security Applications", Proceedings of the International Conference on Industrial Electronics, Control and instrumentation (IECON), Kobe, Oct. 28-Nov. 1, 1991, New York, IEEE, US, vol. 1 CONF. 17, Oct. 28, 1991, pp. 1063-1066.

(Continued)

*Primary Examiner*—Fan Tsang
*Assistant Examiner*—Hemant Patel
(74) *Attorney, Agent, or Firm*—Staas & Halsey LLP (57) ABSTRACT

A robot of the present invention moves to a place where a user is, in response to the voice of the user who is calling the robot. Then, when the user presses a switch, the robot recognizes that the user desires to send an urgent call and dials a pre-registered telephone number for sending urgent calls. When a receiver responds, the robot reads out and delivers a predetermined message to the receiver as a voice message, and switches the telephone to the handfree state so that the user can talk without holding the telephone.

8 Claims, 9 Drawing Sheets

U.S. PATENT DOCUMENTS

| | | | |
|---|---|---|---|
| 2002/0160757 A1* | 10/2002 | Shavit et al. | 455/414 |
| 2002/0181723 A1* | 12/2002 | Kataoka | 381/92 |
| 2002/0183598 A1* | 12/2002 | Teraura et al. | 600/300 |
| 2004/0019406 A1* | 1/2004 | Wang et al. | 700/231 |

FOREIGN PATENT DOCUMENTS

| | | |
|---|---|---|
| EP | 1 122 038 A1 | 8/2001 |
| JP | 4-104649 | 4/1992 |
| JP | 5-300950 | 11/1993 |
| JP | 7-213753 | 8/1995 |
| JP | 10-234681 | 9/1998 |
| JP | 11-9561 | 1/1999 |
| JP | 2001-125585 | 5/2001 |
| JP | 2002-9973 | 1/2002 |
| WO | WO 99/17854 | 4/1999 |

OTHER PUBLICATIONS

Engelhardt, "An Overview of Health and Human Service Robotics", Robotics and Autonomous Systems, Elsevier Science Publishers, Amsterdam, NL, vol. 5, No. 3, Nov. 1, 1989, pp. 205-226.

* cited by examiner

(NAME)

(NAME TABLE)

FIG.5

| USER NAME | VOICEPRINT DATA |
|---|---|
| HANAKO | A |
| TARO | B |
| YUKIKO | C |

USER IDENTIFICATION TABLE

FIG.6

| FLOOR LAYOUT OF HOUSE |
|---|
| IMAGES OF INSIDE OF HOUSE |

MAP INFOMATION

FIG.7

FIG.8 USER LOCATION TABLE

FIG.9

| PRIORITY SEQUENCE | DESIGNATION MODE | TELEPHONE/E-MAIL | TELEPHONE NO./ E-MAIL ADDRESS | CONTENTS OF MESSAGE |
|---|---|---|---|---|
| 1 | SHORT AND ONCE | TELEPHONE | 01-2345-6789 | EMERGENCY. I AM XXXX. EMERGENCY. ..... |
| 2 | DOUBLE | TELEPHONE | 98-7654-3210 | SEND AMBULANCE. |
| 3 | LONG AND ONCE | E-MAIL | ABC @ DETG | EMERGENCY! HELP! (NAME, ADDRESS, etc.) |

EMERGENCY REPORTING TABLE

ROBOT

BACKGROUND OF THE INVENTION

1. Field of the Invention

The present invention relates to a robot having a moving mechanism for causing the robot to freely move.

2. Description of the Related Art

The population of the aged has increased to date and is expected to grow more and more in the future. In such an aging society, how to send out an urgent call for help is a serious problem when an aged person unexpectedly becomes ill when being at home alone for example.

A telephone with a function of sending emergency calls may be used in such a case. However, this type of telephone is not useful when a sick person cannot move at all because he/she needs to reach the place where the telephone is located.

There is a technique for automatically transmitting emergency calls using a mobile robot (refer to Japanese Patent Laid-open No. Hei. 5-300950, for example). In this technique, when plural sensors of the robot detect an abnormality such as a fire, a gas leak, an intruder, etc., the detected abnormality is automatically notified to a fire station, a police office, etc.

There is also a technique for providing voice commands to a robot (refer to Japanese Patent Laid-open No. 2001-125585, for example).

In the above conventional techniques however, disorders occurred in a human body are not transmitted. Therefore, it is conceivable to adapt these techniques to a system for detecting and transmitting such disorders, especially sudden illness etc.

However, even if a system improved in this way is provided, it still has a problem of how to precisely detect disorders of a person's body, and may invade privacy of the person if a detection error occurs.

SUMMARY OF THE INVENTION

In view of the foregoing, it is an object of the present invention to provide a robot suitable for reporting emergencies.

To achieve the above-mentioned object, the present invention provides a robot having a moving mechanism for causing the robot to move freely and further having: a communication section which wirelessly connects to a communication line; a detection section which detects a request provided by a user; a storing section which stores a message and a telephone number; and a telephone control section which causes the communication section to dial the telephone number stored in the storing section in response the detection section detecting the request provided by the user, and then delivers the message stored in the storing section as a voice message to a receiver when the receiver responds.

According to Japanese Patent Laid-open No. Hei. 5-300950 as mentioned above, the mobile robot has the sensors for detecting designated various abnormalities. The technique disclosed in this document aims for causing the robot to move to various locations so that the robot detects whether there is an abnormality or not in the various locations. On the other hand, the present invention aims for causing the freely moving robot having a function of sending urgent calls to approach the user.

The robot of the present invention may be for example a self-running type of robot that goes round to visit various locations, and may be a robot that moves closer to the user in response to the voice of the user calling the robot as described later.

The robot of the present invention freely moves around and has a function of sending urgent calls as mentioned above. Specifically, the robot of the present invention is characterized by a combination of the following two functions: moving closer to the user as expected by the user who cannot move, and sending an urgent call when the user desires to do so.

Since the present invention is configured such that the robot sends an urgent call only when it is desired by the user, problems related to the privacy of the user can be avoided.

Further, the robot of the present invention preferably has the storing section that stores plural telephone numbers and plural messages respectively associated with the plural telephone numbers, and also detects plural modes of requests. Furthermore, the telephone control section of the robot preferably dials a telephone number according to a mode of request detected by the detection section, and delivers a message associated with the dialed telephone number.

By such preferred structure, it is possible to provide plural modes of sending urgent calls.

It is also preferable that the robot of the present invention further includes a microphone and a speaker so that the telephone control section causes, after delivering the message to the receiver, the communication section to be in a state of communication using the microphone and the speaker.

With such configuration, the user can describe what is happening in detail over the telephone using the microphone and the speaker.

Also, it is preferable that the robot of the present invention further includes an e-mail transmission function. In addition, it is preferable that the storing section further stores an e-mail address and a message associated with the e-mail, the detection section detects plural modes of requests, and the telephone control section transmits the message associated with the e-mail address stored in the storing section according to a mode of request detected by the detection section.

Furthermore, it is preferable that the telephone control section dials a telephone number according to a mode of request detected by the detected section when the detected mode of request is a telephone mode, and then, if a receiver does not respond, the telephone control section transmits the message to the e-mail address stored in the storing section.

By including the mode of delivering an emergency using e-mail in this way, the emergency message can be more securely delivered.

It is further preferable that the robot of the present invention includes: a microphone; a voice recognition section which recognizes that the robot is called based on a voice received by the microphone; and a movement control section which controls, when the voice recognition section recognizes that the robot is called, the moving mechanism so as to move the robot closer to a speaker who is calling the robot.

As for the conventional robot of the going-the-rounds type as mentioned above, if an emergency occurs immediately after the robot passes the user, the user has to wait for a long time until the robot goes another round and reaches the user. Therefore, it may be too late when the robot reaches the user. On the contrary, the robot of the present invention comes closer to the user upon being called by the user so that the waiting time of the user can be reduced and the robot can reach the user in time.

DETAILED DESCRIPTION OF THE PREFERRED EMBODIMENTS

Embodiments of the present invention will be described hereinafter.

Figure 1:
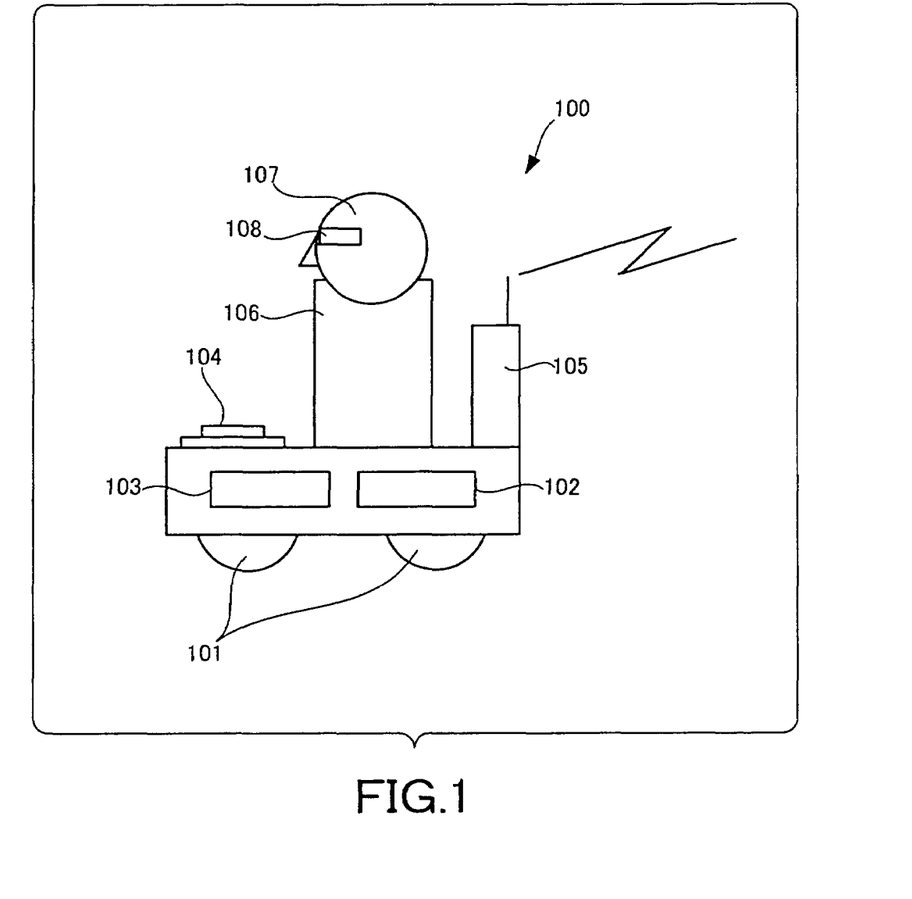
FIG. 1 is a side view of a robot of the present invention.
Figure 2:
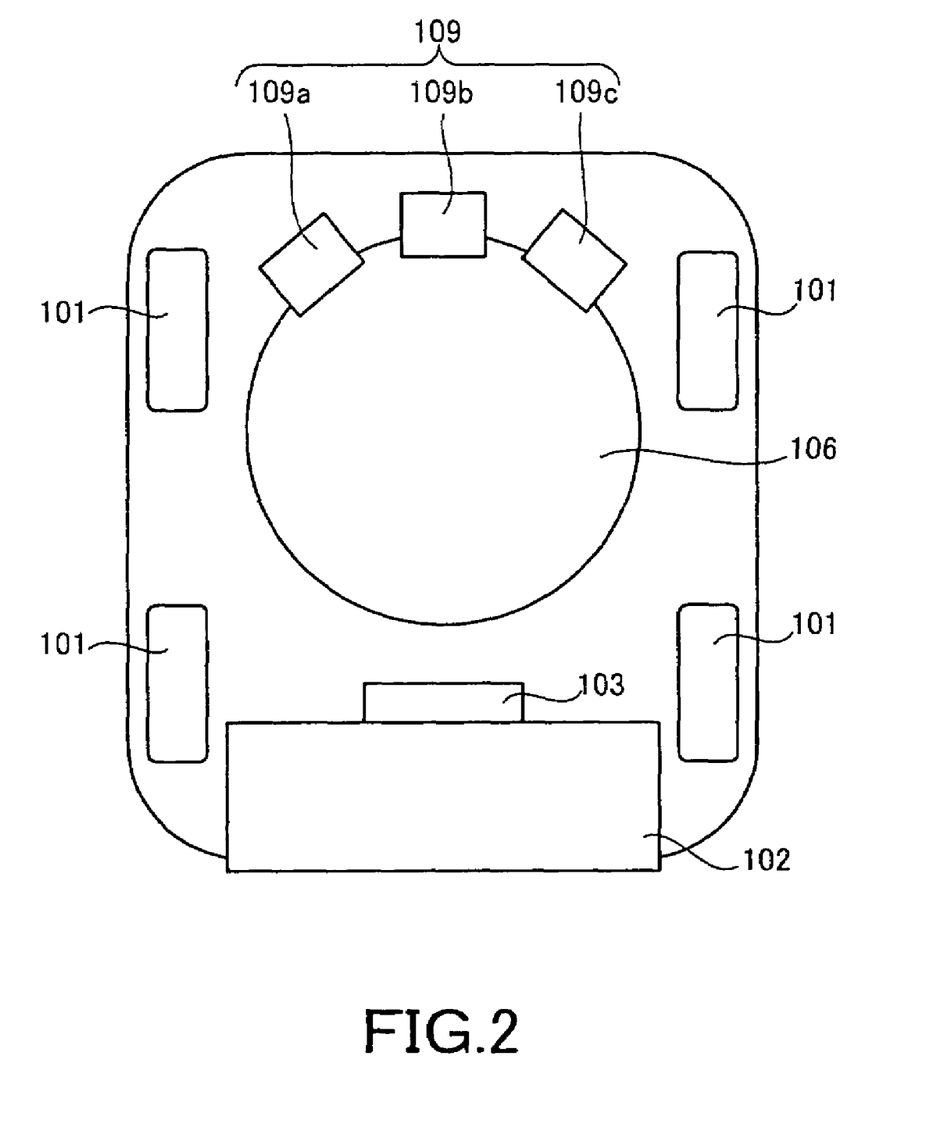
FIG. 2 is a schematic plan view of the robot.

FIG. 1 is a side view of a robot of the present invention, and FIG. 2 is a schematic plan view of the robot.

A robot 100 is composed of wheels 101 provided as a moving mechanism, a control section 102, a storing section 103, a button (switch) 104, a wireless communicator 105, a body 106, a head 107 having a mechanism for facing various directions, and a camera 108. The camera 108 is fixed on the head 107 and looks like eyes of a doll.

The wheels 101 cause the robot 100 to move or rotate freely. The control section 102 has the entire control of the robot. The control performed by the control section 102 is divided into two kinds: one is for moving the robot, and the other is for telephoning to deliver messages or sending e-mails. The storing section 103 stores data such as data on movement and data on voice recognition. In the present embodiments, the functions of the control section and storing section are loaded on a CPU board 113 shown in FIG. 3.

The button 104 is to be pressed by a user when he/she requests an emergency report.

The wireless communicator 105 performs communications such as telephoning, e-mails sending, etc.

The body 106 supports the head 107, and has a battery 114 (refer to FIG. 3) therein. The body 106 also has a microphone group 109 composed of three microphones 109a, 109b and 109c (refer to FIG. 2), and a speaker 110 (refer to FIG. 3). The microphones 109a, 109b and 109c not only receive the user's voice but also perceive the direction from which the voice is coming.

The head 107 looks like a head of a doll in appearance and supports the camera 108. The head 107 also moves the camera so that the camera faces in various directions. The camera 108 photographs images while the robot is moving, and the storing section 103 stores map information including images taken from various angles of the inside of the house. Therefore, while moving, the robot can reach a destination without fail by carrying out pattern matching using the images of the map information and those taken by the camera 108.

Figure 3:
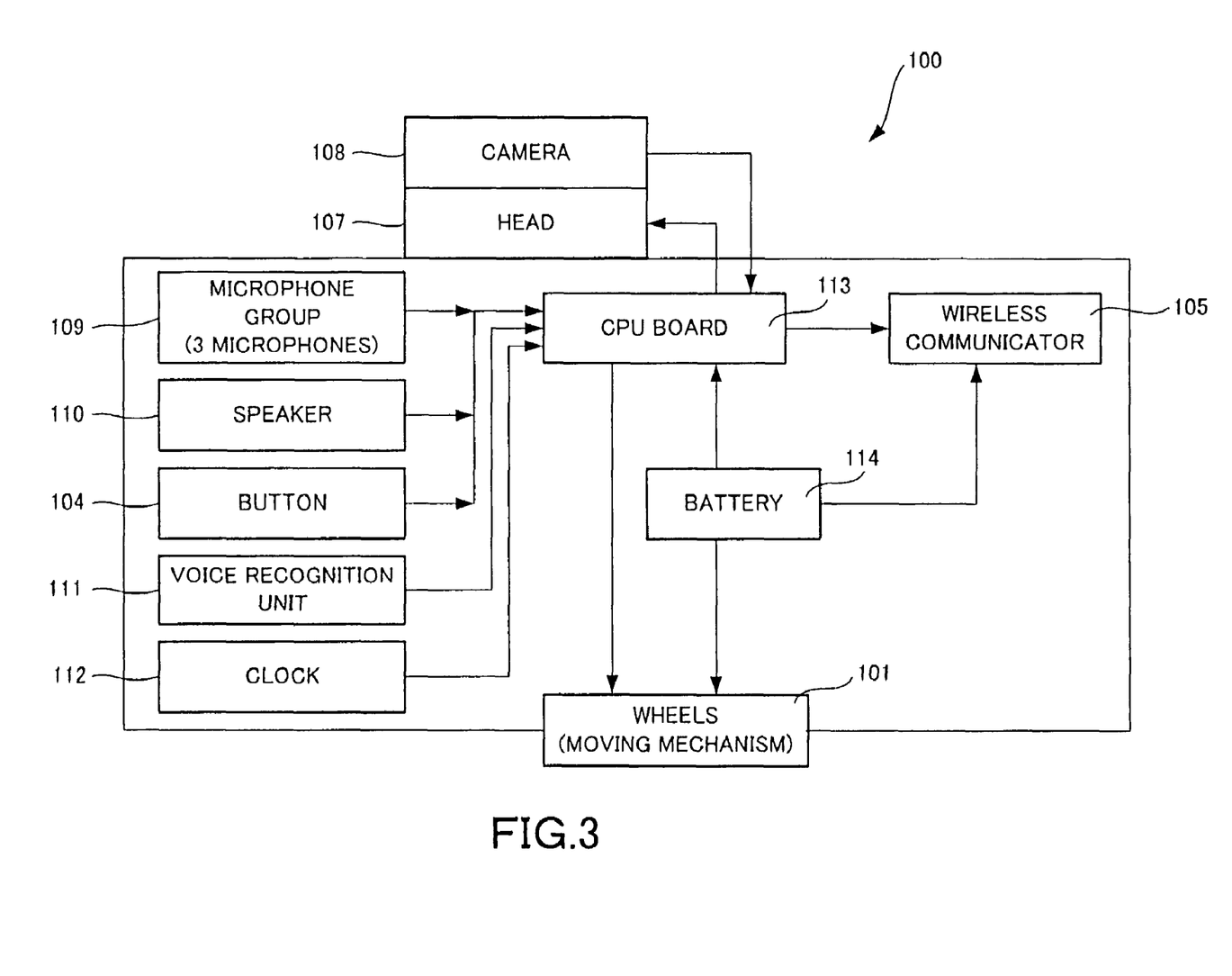
FIG. 3 is a block diagram showing a configuration of the robot shown in FIGS. 1 and 2.

FIG. 3 is a block diagram showing the configuration of the robot 100 shown in FIGS. 1 and 2.

FIG. 3 shows the speaker 110, a voice recognition unit 111, a clock 112, the CPU board 113 and the battery 114, which are not shown in FIGS. 1 and 2. The speaker 110 and microphone group 109 function together as a hand-free phone. Also, the speaker 110 is used when the robot 100 speaks to the user.

The voice recognition unit 111 stores the name of the robot 100. Upon receiving a voice caught by the microphone group 109 through the CPU board 113, the voice recognition unit 111 determines if the name of the robot 100 is called or not by recognizing the received voice. Further, the voice recognition unit 111 stores voiceprint data for plural users and thus recognizes who is calling the robot 100.

The clock 112 is used for indicating the current time.

The CPU board 113 includes, besides a CPU, a memory for storing programs executed by the CPU and various data (a user location table shown in FIG. 8, an emergency reporting table shown in FIG. 10, the above-described map information of the inside of the house, etc.), various I/O interfaces for signal input/output, and the like. The CPU board 113 has all kinds of control over the robot 100 and includes the functions of the control section 102 and storing section 103.

The battery 114 supplies the power for operating the robot 100. FIG. 3 shows the battery 114 supplying the power only to the CPU board 113, wireless communicator 105, and wheels 101 to avoid complication. However, the battery 114 also supplies the power to other components of the robot 100.

Figure 4:
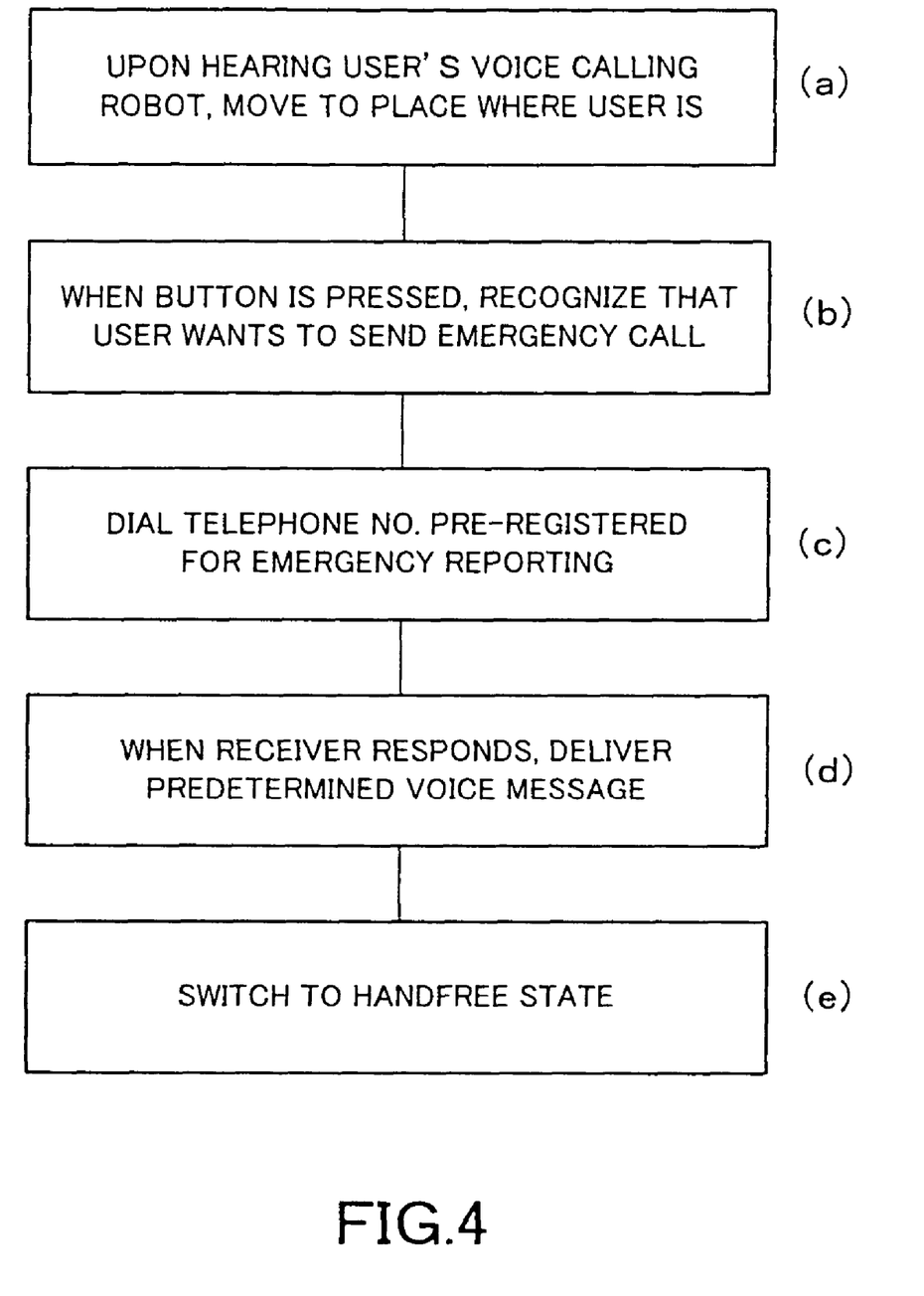
FIG. 4 is a flowchart showing an outline of an operating sequence of the robot shown in FIGS. 1 to 3.

FIG. 4 is a flowchart showing an outline of an operating sequence of the robot 100 shown in FIGS. 1 to 3.

Upon being called by the user, the robot moves to a place where the user is (step a).

When the user presses the button, the robot recognizes that the user desires to send out an emergency call (step b) and executes the following operations.

First, the robot 100 dials a telephone number pre-registered for emergency reporting (step c). When a receiver responds over the telephone, the robot delivers a predetermined voice message (step d), and then switches the telephone to a hand-free state so that the user can talk without holding it (step e). By these operations, the occurrence of an emergency can be reported in a message first, and then the user can give the details if he/she can still talk.

The operation sequence shown in FIG. 4 will be described more in detail.

Figure 5:
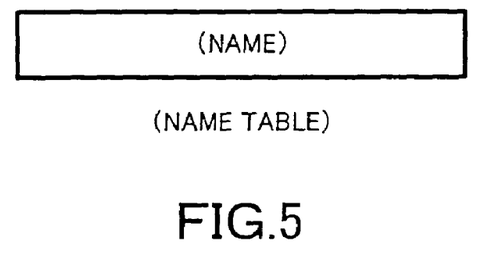
FIG. 5 is a name table storing the name of the robot.
Figure 6:
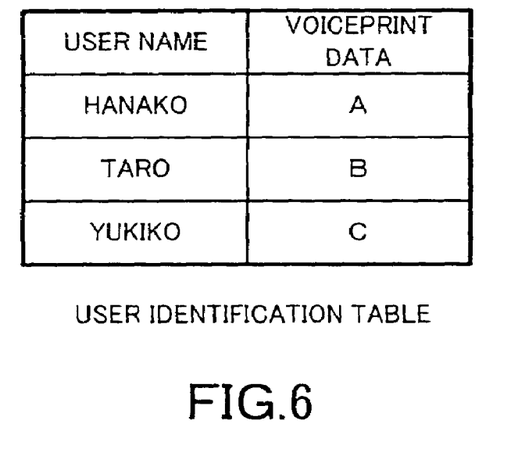
FIG. 6 is a user identification table in which names of plural users using the robot are associated with their voiceprints.

FIG. 5 is a name table storing the name of the robot 100, and FIG. 6 is a user identification table in which names of plural users using the robot 100 are associated with their voiceprints.

These tables are stored in the voice recognition unit 111 shown in FIG. 3. The voice recognition unit 111 analyzes a voice received by the microphone group 109, and then, determines whether the name stored in the name table is called or not based on the name table shown in FIG. 5. Also, the voice recognition unit 111 analyzes the voiceprint of the voice received by the microphone group 109, and determines who is calling the robot 100 based on the user identification table shown in FIG. 6.

Figure 7:
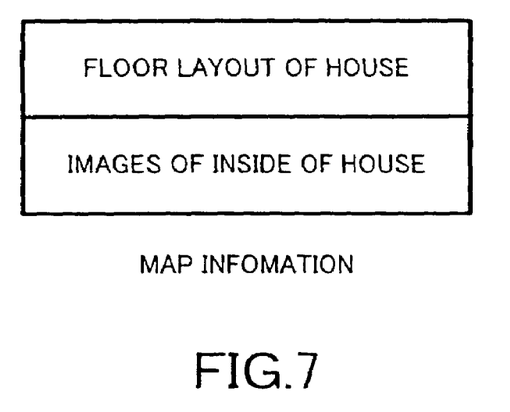
FIG. 7 is a schematic diagram showing map information on the inside of a house.

FIG. 7 is a schematic diagram showing the map information on the inside of the house.

The map information includes a floor layout and images of places taken from various directions in the inside of the house. The map information is stored in the storing section 103 shown in FIGS. 1 and 2 of the robot 100, specifically in the CPU board 113 shown in FIG. 3.

Figure 8:
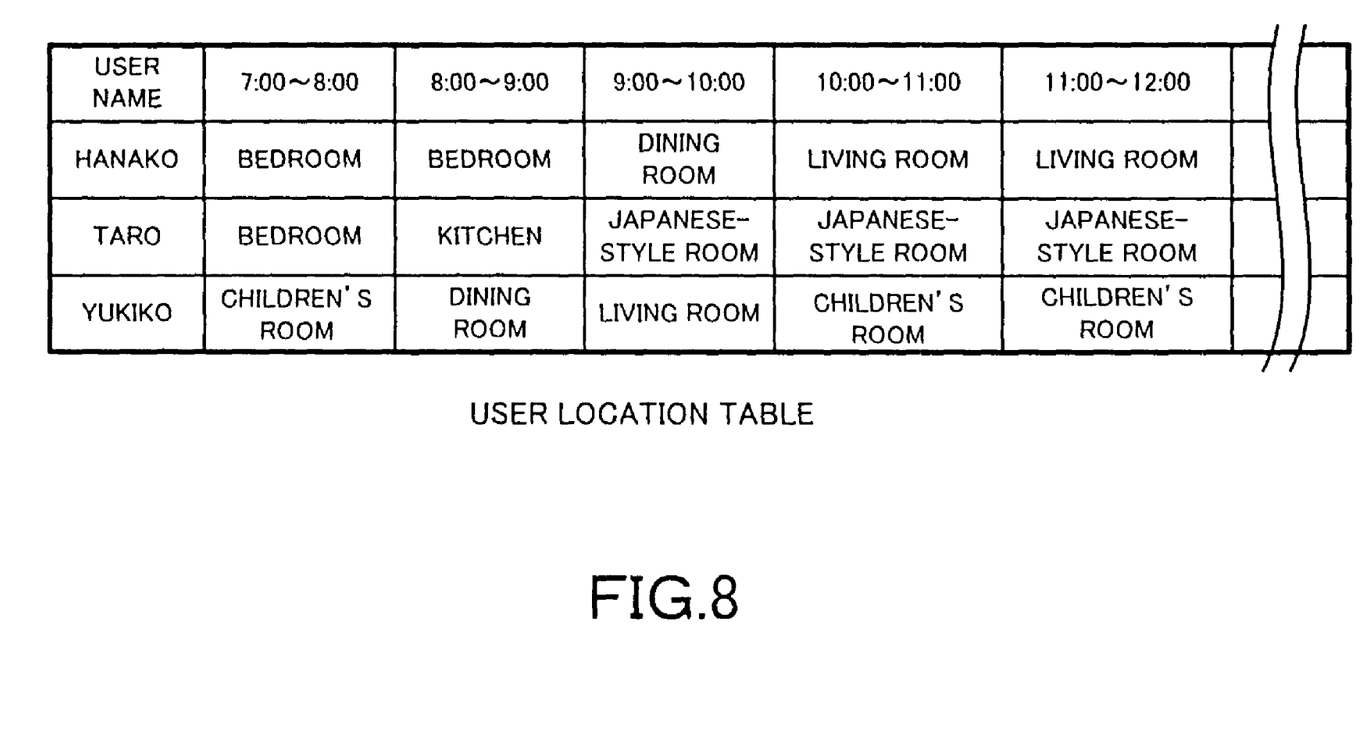
FIG. 8 is a user location table storing the locations of the users being inside the house for each time zone.

FIG. 8 is the user location table storing the locations of the users being inside the house for each time zone.

The user location table is also stored in the storing section 103 shown in FIGS. 1 and 2 of the robot 100, specifically in the CPU board 113 shown in FIG. 3.

In the present embodiments, referring to the user location table, the robot determines where the user who is calling the robot is located. As a result, the robot quickly moves closer to the user.

Figure 9:
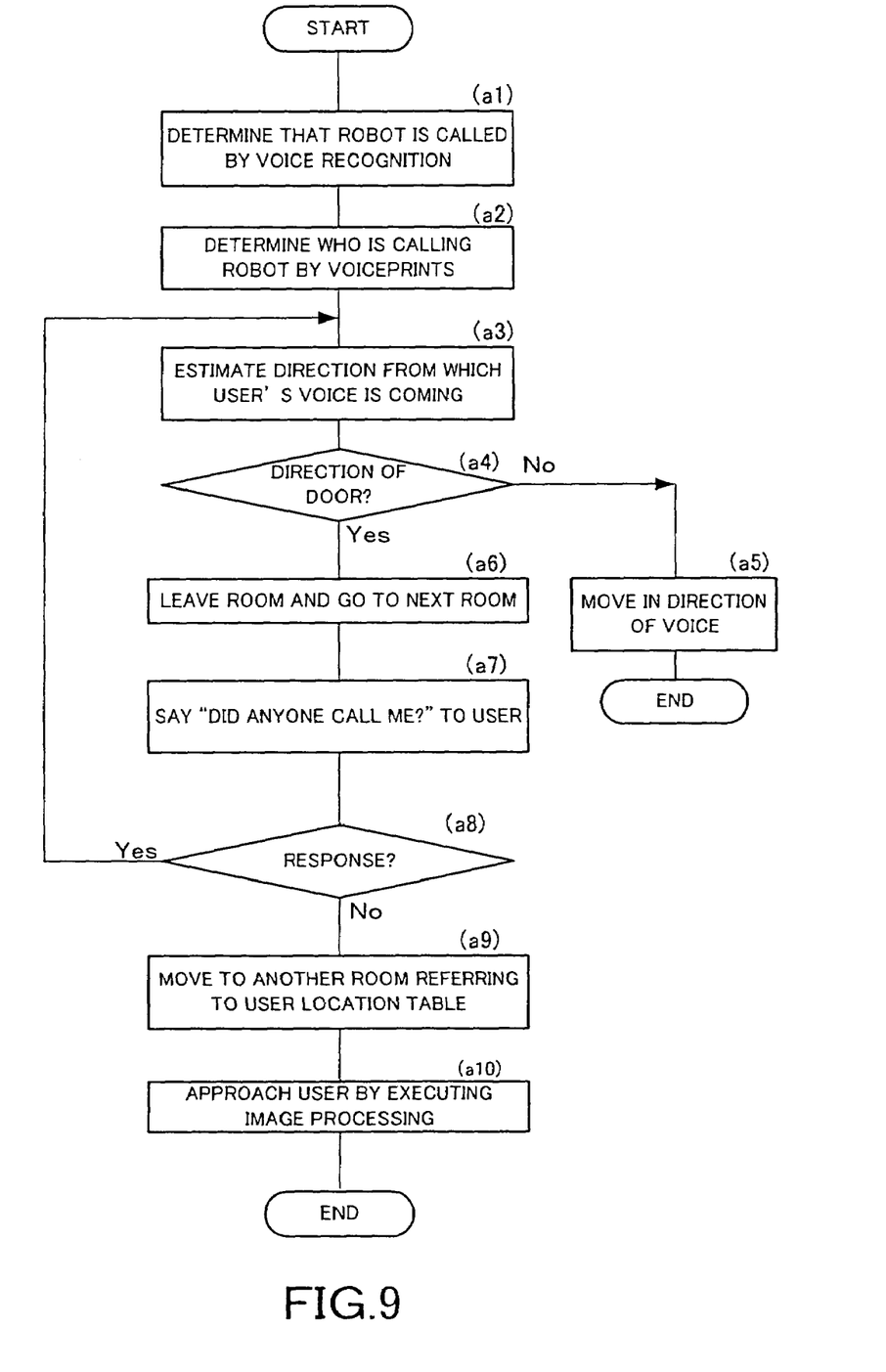
FIG. 9 is a flowchart showing the operations of the robot when the robot is called.

FIG. 9 is a flowchart showing the operations of the robot when the robot is called. The flowchart shown in FIG. 9 corresponds to step a of the outline flowchart shown in FIG. 4.

When the microphone receives the voice, the received voice is transmitted to the voice recognition unit 111 via the CPU board 113 shown in FIG. 3. The voice recognition unit 111 recognizes the voice to obtain a word (a character string), and compares the obtained word with the name of the robot 100 registered in the name table shown in FIG. 5. And then, if the obtained word matches the name of the robot 100, the voice recognition unit 111 determines that the robot 100 is called (step a1). Subsequently, the voice recognition unit 111 analyzes the voiceprint of the received voice referring to the user identification table shown in FIG. 6, and determines who is calling the robot 100 (step a2).

The microphone group 109 (three microphones 109a, 109b, and 109c shown in FIG. 2) first estimates the direction from which the user's voice is coming (step a3), and next determines whether the voice is coming from the door or the inside of the room where the robot 100 is present (step a4).

If the microphone group 109 determines the robot 100 is called in the inside of the room, the robot 100 moves in the direction of the voice (step a5).

On the contrary, if the microphone group 109 determines the voice is coming from the direction of the door (step a4), the robot 100 leaves the room and enters the next room (including corridors and a kitchen) (step a6). And then, the robot 100 speaks to the user saying like "Did anyone call me?" through the speaker 110 shown in FIG. 3 (step a7).

If the user responds (step a8), the process returns to step a3, in which the microphone group 109 estimates the direction of the user's voice and the robot 100 finally reaches the user (step a5).

If the user does not respond (step a8), the robot determines the room where the user is supposed to be present referring to the user location table shown in FIG. 8 and the clock 112 shown in FIG. 3, and goes to the determined room referring to the map information shown in FIG. 7 (step a9). Subsequently, by performing image processing, the robot finds an object that does not exist on the information map and appears to be the user, and approaches the object (step a10). If the robot finds no object appearing to be the user in the rooms registered in the user location table, it searches for the user by executing the image processing while visiting the rooms one after another to reach the user.

Figure 10:
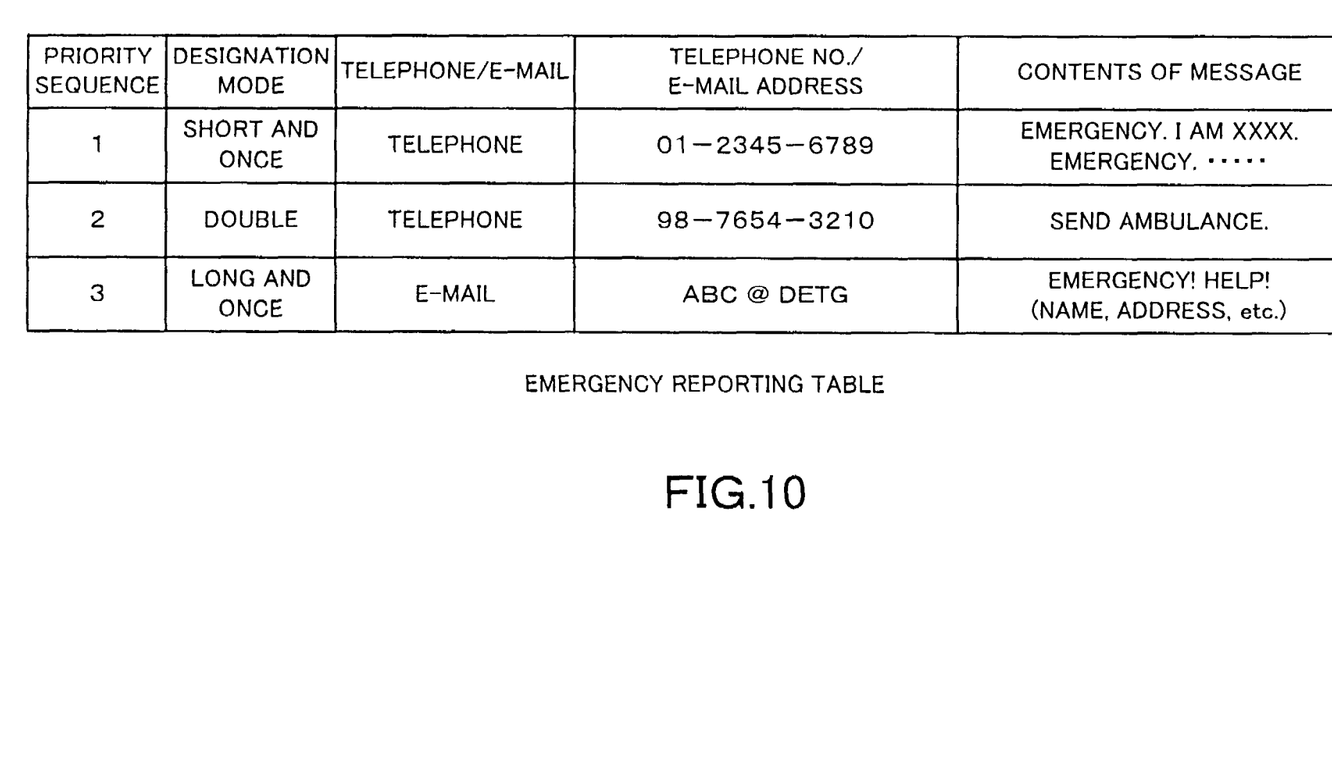
FIG. 10 is an emergency reporting table.

FIG. 10 is the emergency reporting table.

The emergency reporting table records the following items, "priority sequence", "designation mode", "telephone/e-mail", "telephone No./e-mail address", and "message", which are all associated.

The emergency reporting table is also stored in the storing section 103 shown in FIGS. 1 and 2, precisely in the CPU board 113 shown in FIG. 3, like the map information shown in FIG. 7 and the user location table shown in FIG. 8.

Figure 11:
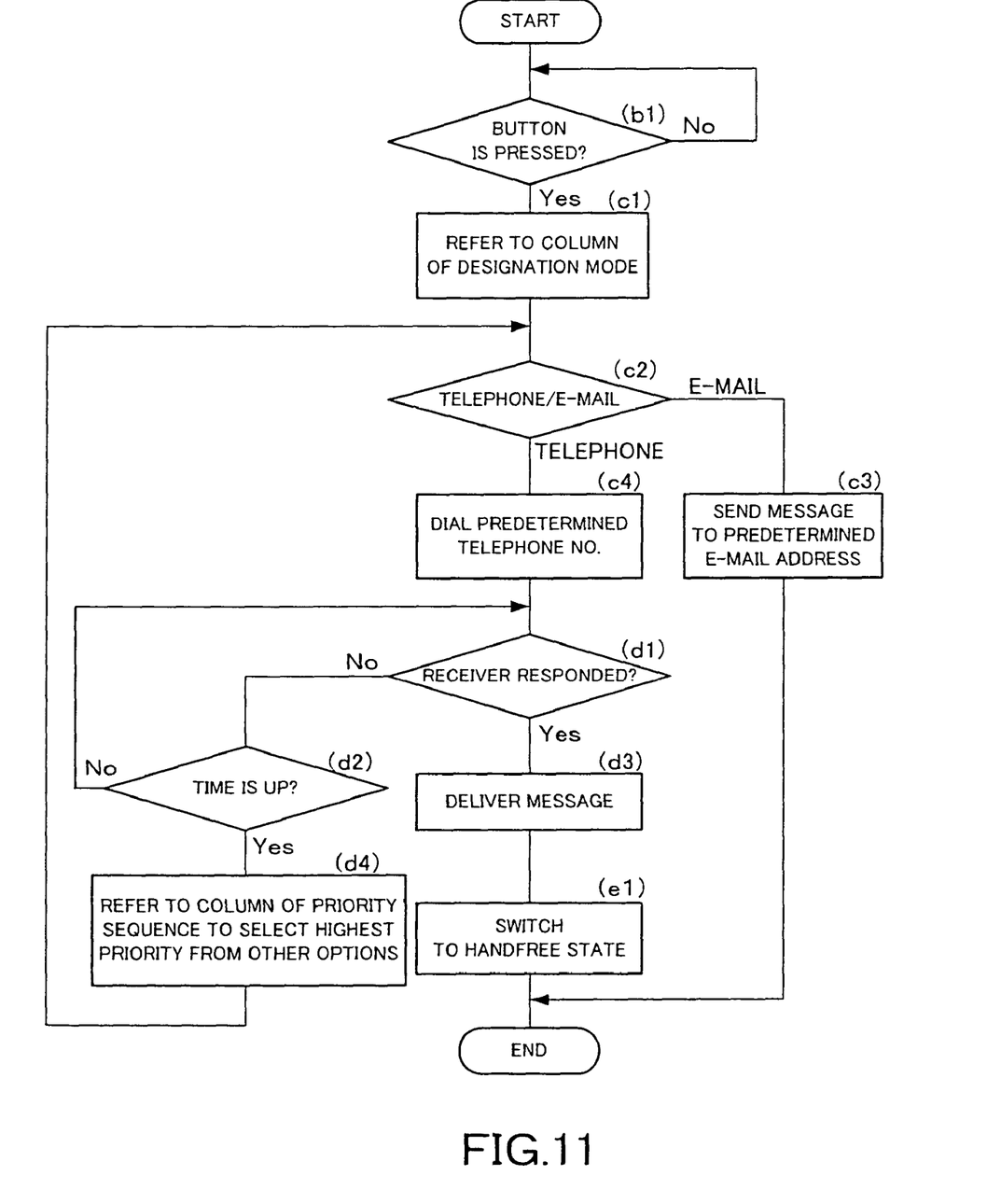
FIG. 11 is a flowchart showing the operations of the robot after the robot reaches the user.

FIG. 11 is a flowchart showing the operations of the robot after the robot reaches the user. The flowchart in FIG. 11 shows in detail the steps from b to e of the outline flowchart shown in FIG. 4.

When the button 104 of the robot 100 is pressed (step b1), the robot refers to the column indicating the designation mode in the emergency reporting table shown in FIG. 10, in which the designation modes are defined based on how the user presses the button 104 (step c1). In this case, as shown in the column of "designation mode" in the emergency reporting table of FIG. 10, the following three designation modes are defined: press the button 104 once for a time shorter than a predetermined time length, for example less than 0.5 seconds (referred to as "short and once"); press the button 104 twice, each press takes the time shorter than the predetermined time length (referred to as "double"); press the button 104 once for a time longer than the predetermined time length, for example more than 0.5 seconds (referred to as "long and once").

Next, based on the determined designation mode, whether "telephone" or "e-mail" in the column of "telephone/e-mail" in the emergency reporting table is determined (step c2). If the result is "e-mail", the corresponding message in the column of "message" is transmitted to the corresponding e-mail address in the column of "telephone No./e-mail address" (step c3). In this case, the message "Emergency! Help! (Name, Address, etc.)" is transmitted.

If the result is "telephone" in step c2, the robot 100 dials the corresponding telephone number in the emergency reporting table (step c4) and waits for a response (steps d1 and d2). When the receiver responds, the robot delivers the corresponding message in the emergency reporting table to the receiver as a voice message (step d3). Subsequently, the robot switches the telephone to the handfree state so that the user can talk only using the microphone group 109 and speaker 110 (step e1), in which the user can tell the receiver the emergency condition in detail if he/she can still talk.

After the robot 100 dials the corresponding telephone number in the emergency reporting table (step c4), when there is no response (steps d1 and d2), the robot refers to remainders in the column of "priority sequence" in the emergency reporting table to determine the highest priority destination of the emergency report (step d4) and returns to step c2 to repeat the above-described process.

For example, first, when the user presses the button 104 twice, the robot determines the designation mode is "double" in the emergency reporting table shown in FIG. 10 and dials the telephone number ("98-7654-3210" in FIG. 10) corresponding to "double". And then, if there is no response, the robot selects "1" which means the highest priority among "1" and "3" in the column of priority sequence, and dials the telephone number ("01-2345-6789" in FIG. 10) corresponding to the selected "1". If still there is no response, the robot selects "3" which has not been tried yet in the column of priority sequence, and sends the corresponding message to the corresponding e-mail address.

As described above, an emergency is reported to a predetermined destination as surely as possible according to the present embodiments.

What is claimed is:

1. A robot including a moving mechanism for causing the robot to move freely, comprising:
   a communication section which wirelessly connects to a communication line;
   a detection section which detects a plurality of requests, provided by a user, via an input device upon occurrence of an event;
   a storing section which stores a map information providing a floor layout, a user location table providing a location of the user for each time zone, a reporting table providing telephone numbers and messages;
   a microphone;
   a voice recognition section which recognizes that the robot is called based on a voice received by the microphone;
   a direction assuming section which assumes the direction of the voice detected by the microphone in response to the voice recognition section recognizing that the robot is called;
   a clock;
   a movement control section which controls, when the direction assumed by the direction assuming section is the direction of a door, the moving mechanism so as to move the robot to a location provided in the user location table by referring to the map information and the user location table stored in the storing section as well as referring to the clock; and a telephone control section which causes the communication section to dial one of the telephone numbers provided in the reporting table stored in the storing section in response to the detection section detecting the request provided by the user when the robot arrives at the location, and then delivers the associated message provided in the reporting table stored in the storing section as a voice message to a receiver when the receiver responds.

2. A robot according to claim 1, further comprising a speaker, and wherein the telephone control section causes, after delivering the associated message to the receiver, the communication section to be in a state of communication using the microphone and the speaker.

3. A robot according to claim 1, further comprising an e-mail transmission function, wherein the storing section further stores an e-mail address and a message associated with the e-mail, wherein the detection section detects a plurality of modes of requests, and wherein the telephone control section transmits, according to a mode of request detected by the detection section, the message associated with the e-mail address stored in the storing section.

4. A robot according to claim 3, wherein the telephone control section dials a telephone number according to a mode of request detected by the detection section when the detected mode of request is a telephone mode, and then the telephone control section transmits the message to the e-mail address stored in the storing section when a receiver does not respond.

5. A robot according to claim 1, wherein said telephone control section delivers the associated message based on one of a priority sequences associated with the designation mode of one of the user requests.

6. A robot according to claim 1, wherein the designation mode of a respective one of the user requests is determined by the user pressing a request button in a respective one of a plurality of coded sequences.

7. The robot according to claim 1, wherein the delivered associated message is a voice message delivered to a receiver when the receiver responds.

8. A method of having a free moving robot detect a user emergency request and report an emergency in response, the method comprising:

recognizing that the robot is called based on a voice of a user received by a microphone;

assuming the direction of the voice detected by the microphone when it is recognized that the robot is called;

moving, when the assumed direction is the direction of a door, the robot to a location provided in a user location table that provides a location of the user for each time zone, by referring to the user location table, a map information providing a floor layout, and a clock;

when the robot arrives at the location, detecting from among any of a plurality of emergency requests stored in a memory in a priority sequence with an associated designation mode and telephone number, an emergency request, provided by the user, via an input device upon occurrence of an event; and dialing a telephone number associated with the emergency request in response to the respective designation mode of the detected emergency request, and the robot communicating wirelessly.

* * * * *